(12) United States Patent
Morris et al.

(10) Patent No.: US 7,266,270 B2
(45) Date of Patent: Sep. 4, 2007

(54) WAVEGUIDE TO WAVEGUIDE MONITOR

(75) Inventors: James E. Morris, Charlotte, NC (US); Alan D. Kathman, Charlotte, NC (US); Hongtao Han, Mooresville, NC (US); Michael R. Feldman, Charlotte, NC (US); Charles S. Koehler, Concord, NC (US)

(73) Assignee: Tessera North America, Charlotte, NC (US)

( * ) Notice: Subject to any disclaimer, the term of this patent is extended or adjusted under 35 U.S.C. 154(b) by 132 days.

(21) Appl. No.: 10/184,078

(22) Filed: Jun. 28, 2002

(65) Prior Publication Data

US 2003/0174959 A1 Sep. 18, 2003

Related U.S. Application Data

(60) Provisional application No. 60/364,105, filed on Mar. 15, 2002.

(51) Int. Cl.
  *G02B 6/26* (2006.01)
(52) U.S. Cl. .............................. 385/48; 385/33; 385/17
(58) Field of Classification Search .................. 385/48
  See application file for complete search history.

(56) References Cited

U.S. PATENT DOCUMENTS

| 4,558,920 | A |  | 12/1985 | Newton |  |
|---|---|---|---|---|---|
| 5,061,032 | A |  | 10/1991 | Meltz |  |
| 5,777,763 | A |  | 7/1998 | Tomlinson |  |
| 5,832,156 | A |  | 11/1998 | Strasser |  |
| 5,835,517 | A |  | 11/1998 | Jayaraman et al. |  |
| 6,081,638 | A |  | 6/2000 | Zhou |  |
| 6,122,422 | A | * | 9/2000 | Koeppen et al. | 385/48 |
| 6,625,350 | B2 | * | 9/2003 | Kikuchi et al. | 385/33 |
| 2002/0097956 | A1 | * | 7/2002 | Kikuchi et al. | 385/33 |
| 2002/0097957 | A1 | * | 7/2002 | Kikuchi et al. | 385/33 |
| 2003/0002809 | A1 | * | 1/2003 | Jian | 385/73 |
| 2004/0101247 | A1 | * | 5/2004 | Chen et al. | 385/47 |

\* cited by examiner

*Primary Examiner*—Robert Kim
*Assistant Examiner*—Phillip A. Johnston
(74) *Attorney, Agent, or Firm*—Lee & Morse, P.C.

(57) ABSTRACT

A waveguide to waveguide monitor includes an optics block between the two waveguides. The optics block couples light between the two waveguides and includes at least two parallel surfaces. The monitor also has an optical tap which creates a monitor beam. The optics block may be flush with the endfaces of the waveguides, even if the endfaces are angled. At least two optical elements needed to couple the light between the two optical waveguides and direct the monitor beam on a detector are on the at least two parallel surfaces of the optics block and any surfaces secured thereto.

32 Claims, 5 Drawing Sheets

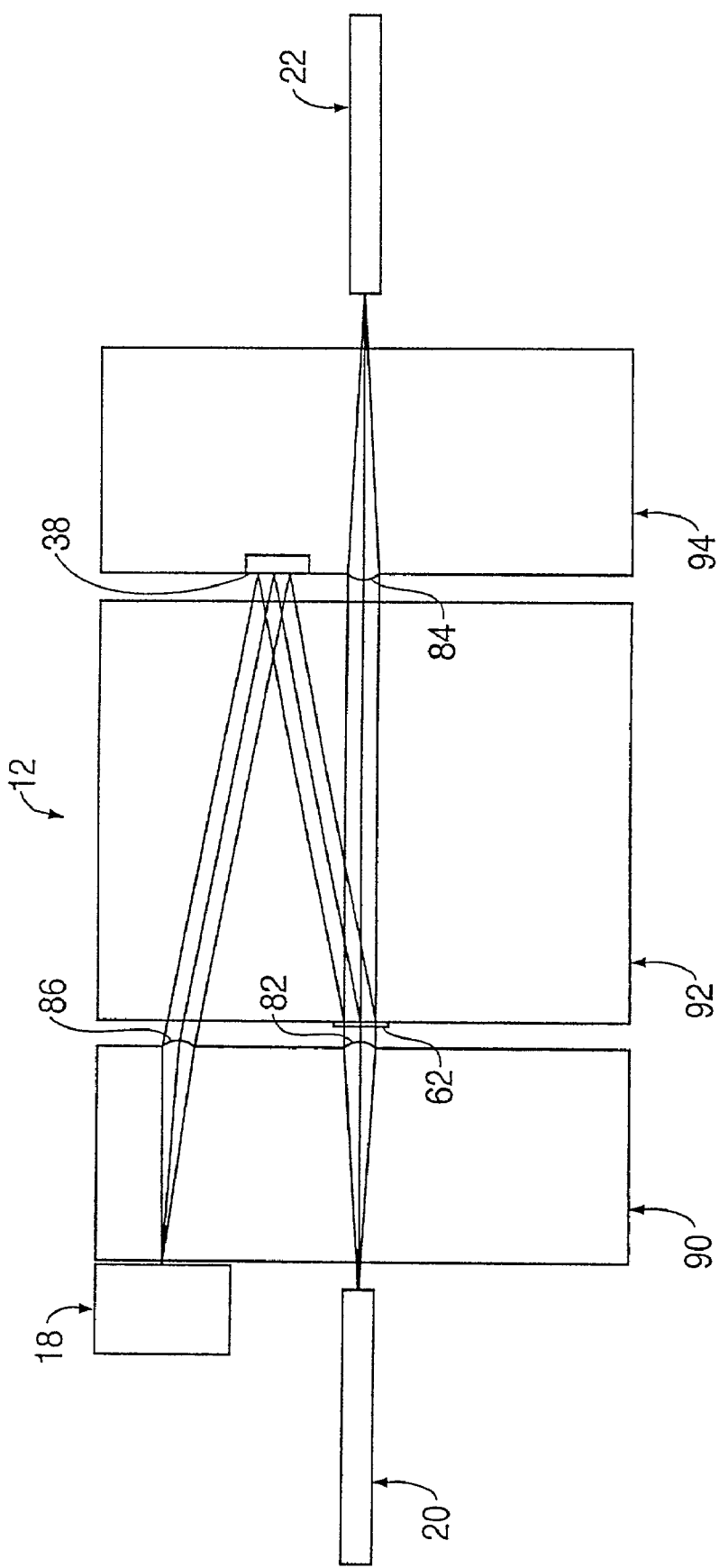

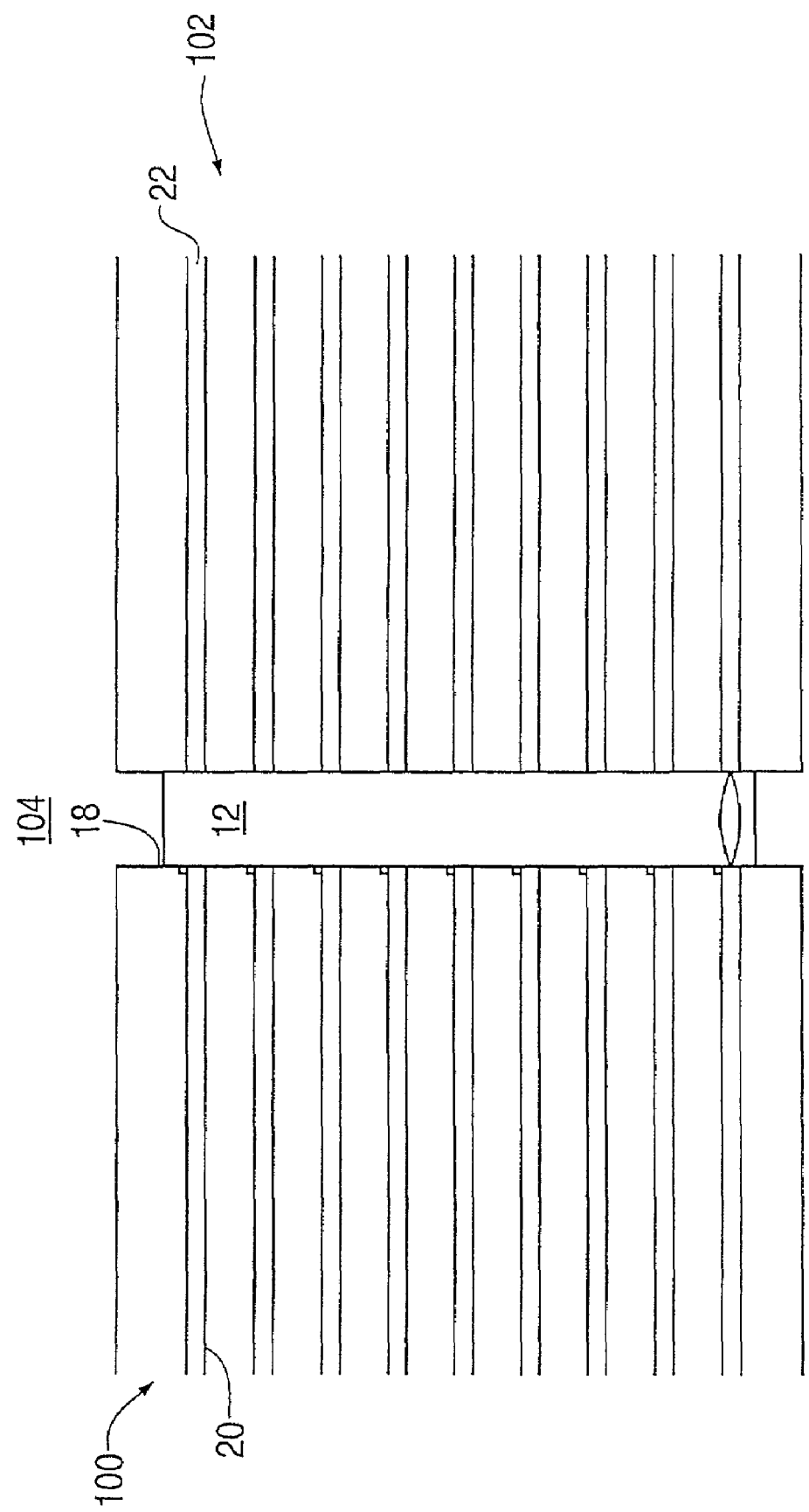

WAVEGUIDE TO WAVEGUIDE MONITOR

CROSS-REFERENCE TO RELATED APPLICATIONS

The present invention claims priority under 35 U.S.C. §119(e) to commonly assigned, co-pending U.S. Provisional Application Ser. No. 60/364,105 filed Mar. 15, 2002, entitled "Waveguide to Waveguide Monitor", the entire contents of which are hereby incorporated by reference for all purposes.

BACKGROUND OF THE INVENTION

1. Field of the Invention

The present invention is directed to a monitor for an optical signal transmitted between two optical waveguides, and in particular to such a monitor that is readily scaleable to arrays.

2. Description of Related Art

In optical communications systems, tapping off part of the beam to monitor it for a variety of parameters, e.g., wavelength, channel power, system feedback, is often desired. There are various known constructions of optical waveguides, including optical fibers, which include physical alterations, e.g., gratings, notches, in the waveguide structure to tap out a portion of the light traveling therein for a number of applications. Most of these techniques are directed to a non-destructive tapping of the waveguide, since alignment of waveguide end points may be inefficient and difficult to align. However, these solutions involve a relatively high loss of signal, e.g., a few dB, and the actual amount of power being tapped off can be difficult to repeatedly manufacture.

Some solutions do use a direct in-line connection between optical waveguides and tap a portion of the entire beam being transmitted between the waveguides. However, the size and cost of conventional fiber couplers make their use impractical. These solutions also assume that the use of such a system will be at terminal ends of the waveguides and do not disclose use of such a system internal to a continuous waveguide, presumably because the above issues have not been sufficiently addressed.

SUMMARY OF THE PRESENT INVENTION

It is therefore an object of the present invention to provide a monitor configuration that substantially overcomes one or more of the problems due to the limitations and disadvantages of the related art.

This and other objects may be realized by providing an apparatus for monitoring an optical signal transmitted over an optical path between two optical waveguides including an optics block between the two optical waveguides. The optics block couples light between the two optical waveguides and includes at least two parallel surfaces. The apparatus includes an optical tap which creates a monitor beam to be directed onto a detector. All of the optical elements needed to couple the light between the two optical waveguides and direct the monitor beam onto the detector are on the at least two parallel surfaces of the optics block and any surfaces secured thereto.

The optics block may be at a non-normal angle relative to the optical path. The non-normal angle may be matched to an angle of an endface of at least one of the two optical waveguides. The optical tap may be the non-normal angle.

The apparatus may include a carrier which aligns the optics block to the two optical waveguides. The carrier may include an indentation for aligning the optics block to the two optical waveguides. The carrier may include an indentation for receiving one or both of the two optical waveguides. The indentation may be a V-groove. The indentation may provide passive alignment between the optics block and the at least one of the two optical waveguides.

The apparatus may include an optical element on each of the at least two parallel surfaces of the optics block. The detector may be mounted on the optics block. At least one of the waveguides may be an optical fiber. The detector may detect power of the monitor beam. The optical tap may be on one of the at least two parallel surfaces of the optics block or a surface secured thereto. The optical tap may be a diffractive element The two optical waveguides may each include an array of optical waveguides, the optics block including optical elements for each pair of waveguides in the arrays, and the detector includes detecting regions for each pair of waveguides. The optics block may be a unitary array of optical elements. The detecting regions may comprise a unitary detector. The apparatus may include a unitary carrier on which the two arrays are mounted.

At least one substrate of the optics block and any substrates secured thereto include a focusing optical element that focuses the monitor beam onto the detector. One of the at least two parallel surfaces of the optics block and any surfaces secured thereto may include a reflective surface.

The apparatus may include a support structure for one of the two waveguides that includes a feature that accommodates the detector. The feature may include a surface at an angle to the monitor that reflects light to the detector. The surface at an angle may include a reflective coating.

All optical elements on the optics block may be lithographically created. All optical elements on the optics block may be aligned to one another on a wafer level. The optics block may be on a carrier. The detector is shielded from the ambient environment. The apparatus may include a shielding submount for the detector. Both endfaces of the optical waveguides may be angled and the optics block may be flush with the endfaces.

This and other objects may be realized by providing an apparatus for monitoring an optical signal transmitted over an optical path between two optical waveguides including an optics block between the two optical waveguides. The optics block couples light between the two optical waveguides. The optics block includes at least two parallel surfaces. At least one of the optical waveguides has an angled endface. The optics block is tilted so the at least two parallel surfaces are parallel with the at least one of the angled endfaces. An optical tap creates a monitor beam to be delivered to a detector.

The optics block may be secured to at least one of the optical waveguides. The both of the two optical waveguides have an angled endface. The two optical waveguides may be an array of optical waveguides and the optics block includes optical elements for each pair of waveguides in the arrays. The optics block may be flush with the at least one optical waveguide having an angled surface.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIG. 7 is a schematic side view of a sixth embodiment of the present invention and FIG. 8 is a top view of a configuration for an array of waveguide monitors of the present invention.

DETAILED DESCRIPTION

Figure 1:
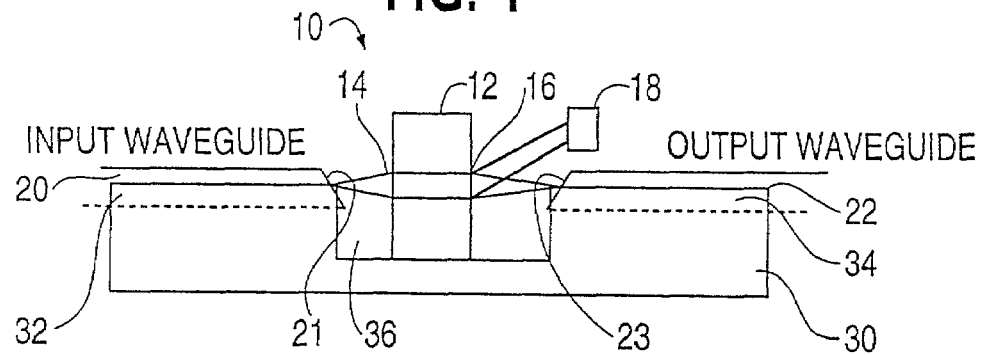
FIG. 1 is a schematic side view of a general configuration in accordance with the present invention.

The present invention will be described in detail through preferred embodiments with reference to accompanying drawings. However, the present invention is not limited to the following embodiments but may be implemented in various types. The preferred embodiments are only provided to make the disclosure of the invention complete and make one having an ordinary skill in the art know the scope of the invention. The thicknesses of various layers and regions are emphasized for clarity in accompanying drawings. Throughout the drawings, the same reference numerals denote the same elements. As used herein, the term "waveguide" is to include a surface waveguide, a fiber or other means for encasing and guiding light.

FIG. 1 illustrates a schematic side view of a general configuration of a monitor 10 between two waveguides 20, 22. The monitor includes an optics block 12 for collimating and focusing light between the two waveguides 20, 22. As shown herein, the optics block 12 has two parallel surfaces 13, 15 and includes optical element 14, 16 on either surface thereof. The optics block 12 also includes a tap on surface 15 that splits off a small percentage of the light and directs it onto an optical detector 18. The optical detector 18 may be used to monitor any desired parameter of the light, e.g., power, wavelength. In this particular configuration, the detector 18 is on the same side as the output waveguide 22.

Figure 1A:
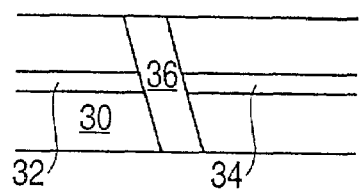
FIG. 1A is a schematic top view of the general configuration of FIG. 1.

A carrier 30 may support both the waveguides and the monitor. The carrier may include V-grooves 32, 34 and an indent 36. The two waveguides 20, 22 are inserted into the respective V-grooves 32, 34 and the optics block 12 is positioned in the indent 36. The depth of the indent 36 may be set so that the optical elements on the optics block 12 are properly vertically aligned with the waveguides 20, 22. If the indent 36 is larger than the optics block 12, alignment features may be provided on the indent to insure proper alignment in the lateral dimensions. FIG. 1A is a top view illustrating the indent 36 formed at an angle to the optical axis of the configuration, allowing simpler alignment of the optics block 12 at an angle if needed to aid in reducing back reflections.

When the waveguides are the same in the configuration of FIG. 1, a continuous waveguide may be provided in a single V-groove in the substrate 30. The system may then be etched to form the indent 36, which also results in the separation of the waveguide into two waveguides 20, 22. The resultant endfaces 21, 23 may be angle polished.

Figure 2:
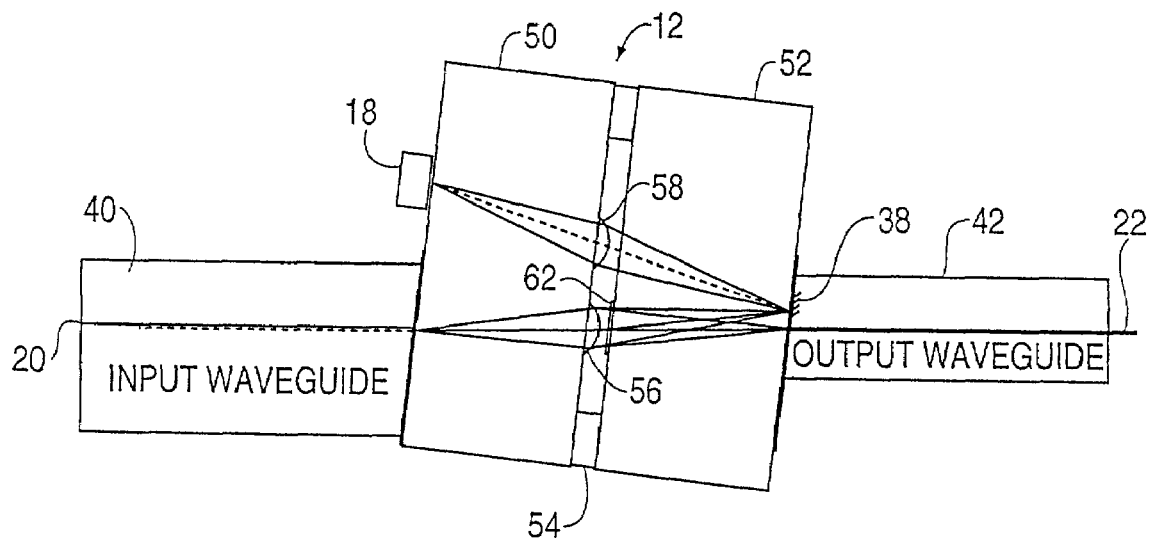
FIG. 2 is a schematic side view of a first configuration of the present invention.

As shown in FIG. 1, the endfaces 21, 23 of the waveguides 20, 22 adjacent to the monitor 10 may be angled. The angle helps reduce back reflections, and hence the noise, in the system. When angled endfaces are used, the optics block 12 may be tilted, e.g., so that the optics block 12 is flush with the waveguide endfaces, as shown in FIGS. 1A and 2. If the substrate 30 is used for support, the walls of the indent could be matched to the angle of the endfaces to provide proper alignment of the optics block 12.

In the particular embodiment shown in FIG. 2, the optics block 12 includes two substrates 50, 52 that have been secured together by a securing element 54. The securing element 54 may be a bonding material, such as an adhesive or solder, a spacer wafer bonded to the substrates 50, 52 with a bonding material or fusion bonded. The spacer wafer may actually be integral with and etched into one of the substrates or may be a separate element. Again, the optics block 12 has at least two parallel surfaces. The first substrate 50 includes two refractive elements 56, 58 and the second substrate 52 includes a diffractive element 62 and a reflective element 38. The first refractive element 56 couples light between the two waveguides 20, 22. The diffractive element 62 splits off a portion of the light which is directed to the reflective element 38. The second refractive element 58 receives light reflected from the reflective element 38 and focuses it onto the detector 18, which here is on the same side as the input waveguide 20. Alternatively, another reflective element could be placed on either substrate 50, 52 to direct the light onto a detector on the same side as the output waveguide 22. As shown in FIG. 2, the detector 18 may be mounted on the optics block 12. Also shown in FIG. 2 are protective covers 40, 42 for the respective waveguides 20, 22. These covers may be, for example, a glass foot to protect the waveguide from being chipped.

The endfaces of either or both of the waveguides may be angle polished. The optics block 12 may be tilted in accordance with angle of the endface. The optics block 12 may be flush with the waveguide(s) have an angled endface. If an endface is not angled, a material, e.g., epoxy, transparent to the wavelengths of interest, may fill in between the optics block 12 and the waveguide, so that there is no air gap within the system.

The use of the optics block 12 in accordance with the present invention allows the optical elements for coupling light between the waveguides at the wafer level, e.g., photolithographically. This wafer level creation also may be controlled to insure precise alignment of the optical elements to one another. Thus, when aligning the optical elements to the waveguides, only the optics block 12 needs to be actively aligned with the waveguides. One manner of achieving this alignment is to provide a curable adhesive, e.g., an UV curable epoxy, between the waveguides and the optics block. The adhesive will keep the components in relative position to one another, while allowing adjustment there between. Once the desired alignment is achieved, the adhesive is then cured to fix the position. When the optics block is used in a configuration as shown in FIG. 1, the waveguides are already aligned to one another and the optics block is secured in an optimal position between them. The optical tap can also be incorporated on the optics block at the wafer level.

Figure 3:
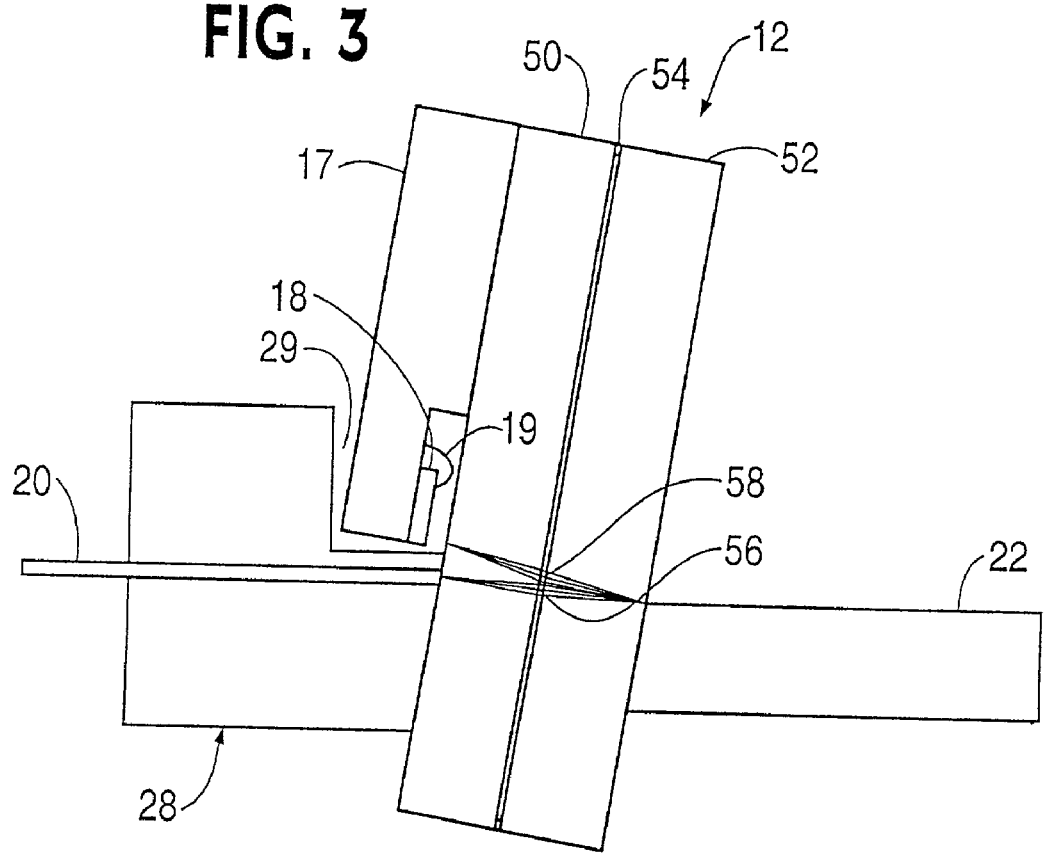
FIG. 3 is a schematic side view of a second configuration of the present invention.

The embodiment shown in FIG. 3 is similar to that shown in FIG. 2, except the diffractive element 62 has been eliminated. Instead the angle of the light at the interface with the output waveguide 22 splits off part of the light to serve as the monitor beam. Most of the light is coupled into the output waveguide, with a small portion being reflected back to the detector 18. Thus, no separate element for the realizing the tap is needed. Additionally, since no diffractive element is used to create the tap, the efficiency of this embodiment may be higher than that of others having a diffractive element. However, the angle achieved by this tap may be limited.

Also shown in FIG. 3 is a wire bond 19 for providing electrical input/output interconnections for the detector 18. FIG. 3 also includes a submount 17 for supporting the detector 18, illustrating one manner in which the detector 18 can be mounted adjacent to, but not on, the optics block 12. Finally, in order to accommodate this submount 17, a substrate 28 supporting the input waveguide 20 includes a notch 29 therein.

Figure 4:
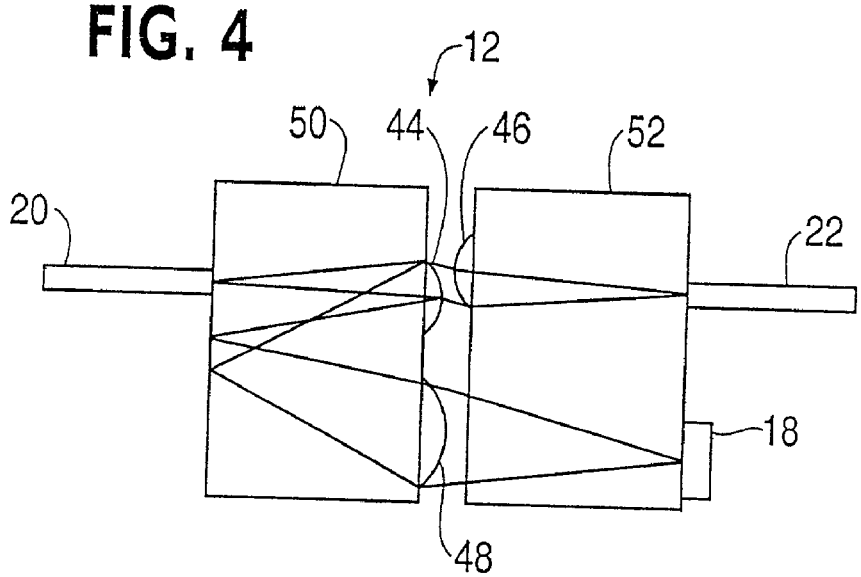
FIG. 4 is a schematic side view of a third configuration of the present invention.

In FIG. 4, another embodiment in which the monitor light is split off without using a diffractive element is shown. Here, the optics block 12 still includes two substrates 50, 52, which may be secured together by the securing element as above. Here, the first substrate includes two refractive elements 44 and 48, while the second substrate 52 includes one refractive element 46. Here, light from the input waveguide 20 is incident on the refractive element 44 off of the optical axis of the refractive element 44. Most of the light passes through and is collimated by the refractive element 44 and is incident on the refractive element 46. The refractive element 46 is correspondingly off-axis and focuses the light to the output waveguide 22. A portion of the light is reflected back at an angle to the back surface of the first substrate 50. This angle may be sufficient to insure reflection from the back surface of the first substrate 50 to the refractive element 48. Alternatively or additionally, a reflective surface may be provided on the first substrate 50. Note that since the light reflected from the refractive element 44 is still diverging, the refractive element 48, which focuses the light onto the detector 18, needs a larger diameter to capture all of the light.

Figure 5:
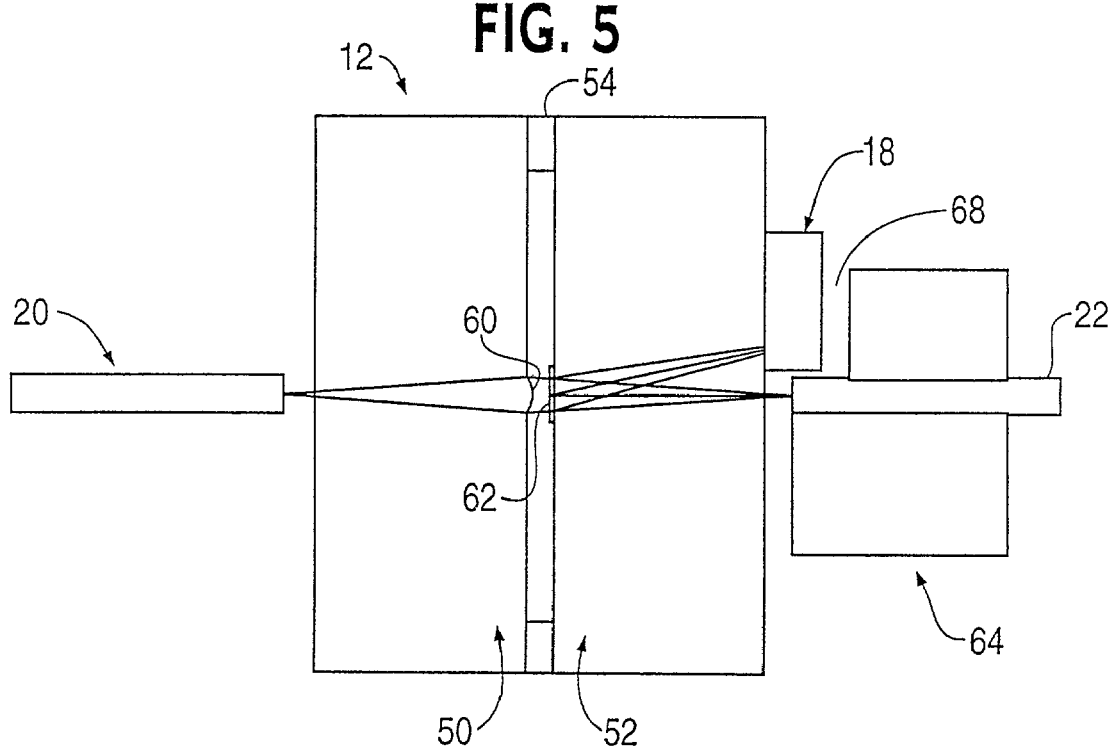
FIG. 5 is a schematic side view of a fourth embodiment of the present invention.

In the particular embodiment shown in FIG. 5, the optics block 12 still includes two substrates 50, 52 that have been secured together by the securing element 54. Here, the first substrate 50 includes one refractive element 60. The refractive element 60 couples light between the two waveguides 20, 22. The second substrate 52 includes a diffractive element 62 that splits off light, e.g., first order diffracted light, to the detector 18, here mounted on the same side as the as the output waveguide 22.

Here, the input waveguide 20 may be supported in any desired manner. As shown in FIG. 5, the output waveguide 22 may be supported using a carrier 64, which may have a V-groove therein for receiving the output waveguide 22, and having an indent 68 therein for accommodating the detector 18. If the angle of the diffracted light from the diffractive element 62 is large enough, such an indent 68 may not be needed. Again, another reflective element could be place on the substrate 52 to direct the light onto a detector on the same side as the input waveguide 20, with a similar indent in the support structure if needed.

Figure 6:
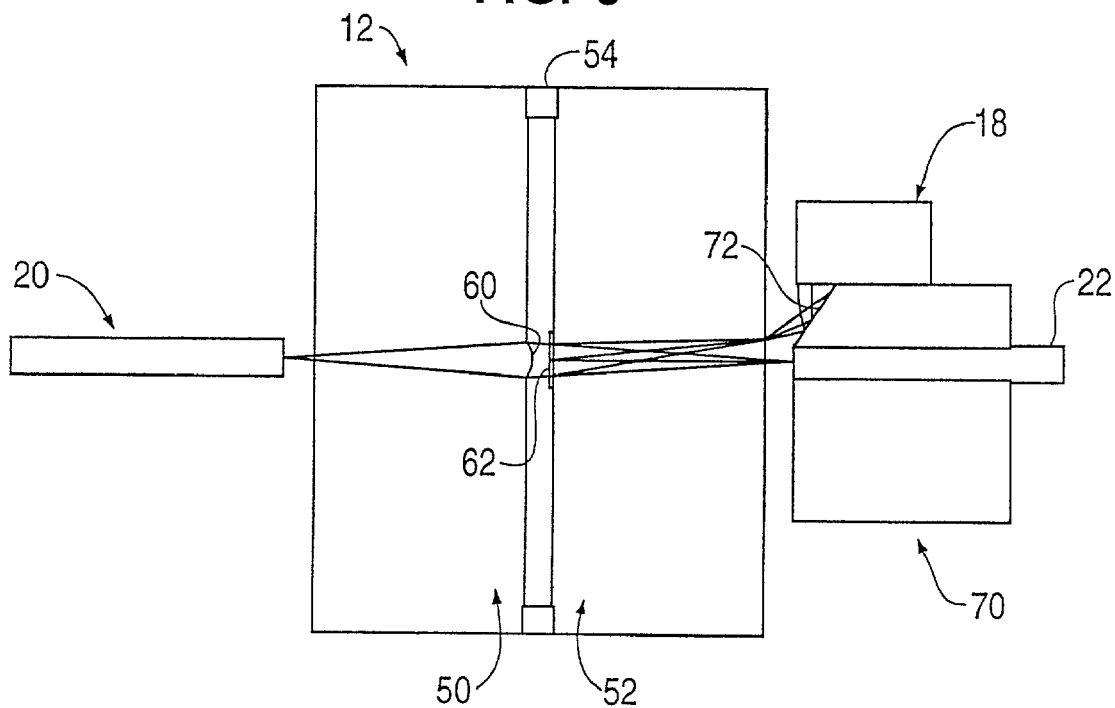
FIG. 6 is a schematic side view of a fifth embodiment of the present invention.

In the particular embodiment shown in FIG. 6, the optics block 12 still includes two substrates 50, 52 that have been secured together by the securing element 54. As in FIG. 5, the first substrate 50 includes the refractive element 60 coupling light between the two waveguides 20, 22. The second substrate 52 includes the diffractive element 62 that splits off light to the detector 18, here mounted on the same side as the as the output waveguide 22. The input waveguide 20 may be supported in any desired manner. As shown in FIG. 6, the output waveguide 22 may be supported using a carrier 70, which may have a V-groove therein for receiving the output waveguide 22, and having an angled surface 72 therein for reflecting light from the diffractive element 62 onto the detector 18. The angled surface 72 may include a reflective coating thereon. The detector 18 may then be mounted on the substrate 70. Again, another reflective element could be place on the substrate 52 to direct the light onto a detector on the same side as the input waveguide 20, with a support structure.

In the particular embodiment shown in FIG. 7, the optics block 12 includes three substrates 90, 92, 94 that may been secured together as in the previous configurations employing two substrates. Here, the first substrate 90 includes a first refractive element 82 that collimates the beam from the input waveguide 20. The second substrate 92 includes a diffractive element 62 that diffracts off part of the light from the collimated beam. The third substrate 94 includes a second refractive element 84 that focuses the light onto the output waveguide 22. Thus, the first and second refractives together couple light between the two waveguides 20, 22. The third substrate 94 also includes a reflective element 38 to direct the diffracted light onto the detector 86. The first substrate 90 may also includes a third refractive element 86 for focusing the diffracted light onto the detector 18. The use of three substrates allows the beam to be detected to be further separated from the main beam. There are numerous variations of the configuration available. For example, the reflective surface 38 could be on a back surface of either the second substrate 92 or the third substrate 94.

FIG. 8 illustrates a top view of a waveguide monitor of the present invention used in conjunction with an array 100 of input waveguides 20 to an array 102 of output waveguides 22. The waveguide arrays 100, 102, may be supported in any known manner. A corresponding monitor array 104 of optics blocks 12 and detectors 18 are arranged between respective waveguides. While the optics blocks 12 are not tilted and the detectors 18 are on the side of the input waveguide 20 in FIG. 8, it is to be understood that any of the previous monitor configurations maybe used. Further, the detector 18 could be a continuous strip across the array 104, thus forming a unitary detector. Detector 18 could also be positioned directly below or above a waveguide or could be on top of the optics block 12.

As shown in FIG. 8, the array 104 of optics blocks may constitute a single optics block 12 with an array of optical elements thereon. The provision of the array 104 of optics blocks 12 on a single unitary structure facilitates the use of the monitor in conjunction with waveguide arrays. The creation of this unitary structure may be readily realized using wafer level processing. The minimum spacing between the waveguides in an array to allow use of the monitor of the present invention is a function of the beam divergence from the input waveguide and a lens diameter needed to capture of the light from the input waveguide. A subset of the waveguides in the array may be tapped and monitored.

In any of the above embodiments, additional optical functioning may be incorporated. For example, a diffractive element may be included to mode match the light to the waveguide. This diffractive may be integrated with a diffractive already present in the system, or may be an additional element.

Using wafer level creation, e.g., photolithography, to create the optical elements results in an optics block having at least two parallel surfaces. This wafer level creation may be controlled to insure precise alignment of the optical elements to one another. Thus, when aligning the optical elements to the waveguides, only the optics block needs to be actively aligned with the waveguides. This wafer level creation also allows ease of extension of the present invention to use with arrays of waveguides. The wafer level creation of arrays of optical elements may further be controlled to properly position the optical elements in the arrays as well as aligning corresponding optical elements in an optical path. These reduced alignment requirements for the optical coupling system facilitate monitoring a beam in an intermediate portion of a system between two waveguides with controlled, minimized loss.

While the present invention is described herein with reference to illustrative embodiments for particular applications, it should be understood that the present invention is not limited thereto. For example, the refractive optical elements could also be diffractive optical elements or diffractive/refractive hybrids. Further, the detector can be on either the input or the output side, or may be on top or bottom of the optics block. The detector may be mounted on the optics block, on a support surface for a waveguide or on its own support structure. The tap may be on a waveguide surface. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. Apparatus for monitoring an optical signal transmitted over an optical path between two optical waveguides, the apparatus comprising:
   an optics block between the two optical waveguides, the optics block coupling light between the two optical waveguides, the optics block including at least two planar substrates secured together, the two planar substrates providing at least two parallel surfaces; and
   the optics block being at a non-normal angle relative to the optical path, thereby creating a monitor beam to be directed onto a detector, the remainder of the light being coupled between the two optical waveguides, wherein all optical elements needed to couple the light between the two optical waveguides and direct the monitor beam onto the detector are on the at least two parallel surfaces of the optics block and any surfaces secured thereto.

2. The apparatus of claim 1, wherein the non-normal angle is matched to an angle of an endface of at least one of the two optical waveguides.

3. The apparatus of claim 1, further comprising a carrier which aligns the optics block to the two optical waveguides.

4. The apparatus of claim 3, wherein the carrier includes an indentation for aligning the optics block to the two optical waveguides.

5. The apparatus of claim 1, further comprising an optical element on each of the at least two parallel walls of the optics block.

6. The apparatus of claim 1, wherein the detector is mounted on the optics block.

7. The apparatus of claim 3, wherein the carrier includes an indentation for receiving at least one of the two optical waveguides.

8. The apparatus of claim 7, wherein the indentation is a V-groove.

9. The apparatus of claim 7, wherein the carrier includes indentations for receiving each of the two optical waveguides.

10. The apparatus of claim 7, wherein the indentation provides passive alignment between the optics block and the at least one of the two optical waveguides.

11. The apparatus of claim 1, wherein at least one of the waveguides is an optical fiber.

12. The apparatus of claim 1, wherein the two optical waveguides each include an array of optical waveguides, the optics block includes optical elements for each pair of waveguides in the arrays, and the detector includes detecting regions for each pair of waveguides.

13. The apparatus of claim 12, wherein the optics block comprises a unitary array of optical elements.

14. The apparatus of claim 12, wherein the detecting regions comprise a unitary detector.

15. The apparatus of claim 12, further comprising a unitary carrier on which the two arrays are mounted.

16. The apparatus of claim 1, wherein the detector detects power of the monitor beam.

17. The apparatus of claim 1, wherein the at least one substrate of the optics block and any substrates secured thereto include a focusing optical element that focuses the monitor beam onto the detector.

18. The apparatus of claim 1, wherein one of the at least two parallel surfaces of the optics block and any surfaces secured thereto include a reflective surface.

19. The apparatus of claim 1, further comprising a support structure for one of the two waveguides that includes a feature that accommodates the detector.

20. The apparatus of claim 19, wherein the feature includes a surface at an angle to the monitor that reflects light to the detector.

21. The apparatus of claim 20, wherein the surface at an angle includes a reflective coating.

22. The apparatus of claim 1, wherein all optical elements on the optics block are lithographically created.

23. The apparatus of claim 1, wherein all optical elements on the optics block are aligned to one another on a wafer level.

24. The apparatus of claim 1, wherein the optics block is on a carrier.

25. The apparatus of claim 1, wherein the detector is shielded from the ambient environment.

26. The apparatus of claim 1, further comprising a shielding submount for the detector.

27. The apparatus of claim 1, wherein both endfaces of the optical waveguides are angled and the optics block is flush with the endfaces.

28. An apparatus for monitoring an optical signal transmitted over an optical path between two optical waveguides, the apparatus comprising:
   an optics block between the two optical waveguides, the optics block coupling light between the two optical waveguides, the optics block including at least two planar substrates secured together, the at least two planar substrates providing at least two parallel surfaces, wherein at least one of the optical waveguides has an angled endface and the optics block is tilted so the at least two parallel surfaces are parallel with the at least one of the angled endfaces; and
   the optics block being at a non-normal angle relative to the optical path, thereby creating a monitor beam to be delivered to a detector, the remainder of the light being coupled between the two optical waveguides.

29. The apparatus of claim 28, wherein the optics block is secured to at least one of the optical waveguides.

30. The apparatus of claim 28, wherein the two optical waveguides have an angled endface.

31. The apparatus of claim 28, wherein the two optical waveguides are an array of optical waveguides, the optics block includes optical elements for each pair of waveguides in the arrays.

32. The apparatus of claim 28, wherein the optics block is flush with the at least one optical waveguide having an angled surface.

* * * * *